(12) United States Patent
Maurer (10) Patent No.: US 7,980,168 B2
(45) Date of Patent: Jul. 19, 2011

(54) HOT BEVERAGE MAKER WITH FILTER DEFORMING MEMBER

(76) Inventor: Scott D. Maurer, Rocky River, OH (US)

(*) Notice: Subject to any disclaimer, the term of this patent is extended or adjusted under 35 U.S.C. 154(b) by 885 days.

(21) Appl. No.: 11/768,479

(22) Filed: Jun. 26, 2007

(65) Prior Publication Data
US 2009/0004351 A1 Jan. 1, 2009

(51) Int. Cl.
*A47J 31/40* (2006.01)
(52) U.S. Cl. ............. 99/287; 99/289 R; 99/323; 99/318; 99/322; 99/304; 210/350; 210/359; 210/383; 210/464; 210/469
(58) Field of Classification Search ............. 99/275, 99/279, 287, 288, 289 R, 323, 318, 322, 304; 210/383, 350, 359, 464, 469, 473, 474
See application file for complete search history.

(56) References Cited

U.S. PATENT DOCUMENTS

| | | | | |
|---|---|---|---|---|
| 3,566,772 A * | 3/1971 | Oliver et al. | | 99/295 |
| 4,191,100 A * | 3/1980 | Marotta | | 99/299 |
| 4,343,305 A * | 8/1982 | Bron | | 604/248 |
| 4,363,262 A * | 12/1982 | Pinckley et al. | | 99/290 |
| 4,697,501 A * | 10/1987 | Hupf | | 99/279 |
| 4,779,520 A | 10/1988 | Häuslein | | |
| 5,265,517 A | 11/1993 | Gilbert | | |
| 5,285,954 A * | 2/1994 | Goglio | | 229/125.14 |
| 5,340,597 A | 8/1994 | Gilbert | | |
| 5,957,035 A | 9/1999 | Richter | | |
| 6,532,862 B2 | 3/2003 | Mork et al. | | |
| 6,725,763 B2 * | 4/2004 | Cai | | 99/287 |
| 6,968,775 B2 * | 11/2005 | Burrows et al. | | 99/303 |
| 7,031,602 B2 * | 4/2006 | Faries et al. | | 392/470 |
| 2002/0121197 A1 * | 9/2002 | Mercier et al. | | 99/279 |
| 2002/0185010 A1 * | 12/2002 | Spiteri | | 99/285 |
| 2003/0029882 A1 * | 2/2003 | Yuyama et al. | | 221/123 |
| 2004/0170409 A1 * | 9/2004 | Faries et al. | | 392/470 |
| 2005/0120884 A1 * | 6/2005 | Kerner | | 99/275 |
| 2005/0145010 A1 * | 7/2005 | Vanderveen et al. | | 73/1.57 |
| 2005/0221034 A1 * | 10/2005 | Iwasaki et al. | | 428/35.7 |
| 2005/0266122 A1 * | 12/2005 | Franceschi | | 426/77 |
| 2006/0011066 A1 * | 1/2006 | Bunn et al. | | 99/279 |
| 2006/0021930 A1 * | 2/2006 | Cai et al. | | 210/323.1 |
| 2007/0028784 A1 * | 2/2007 | Chen et al. | | 99/513 |
| 2007/0066686 A1 * | 3/2007 | Sudoh et al. | | 514/570 |

OTHER PUBLICATIONS

Pivot Definition, Macmillan Dictionary, pp. 1-2.*
Pivot definition, Macmillan dictionary, p. 1, 2009.*

* cited by examiner

*Primary Examiner* — Sang Y Paik
*Assistant Examiner* — Brett Spurlock
(74) *Attorney, Agent, or Firm* — Rankin Hill & Clark LLP (57) ABSTRACT

A process for making a hot beverage, such as coffee or tea, includes placing ground coffee or tea into a filter, inserting the filter into a filter basket to support the filter with respect to a reservoir that is to receive a brewed beverage; introducing water into the filter; and repeatedly deforming the filter to alter its shape as water passes through the filter and ground coffee or tea en route to the reservoir. A device for making a hot beverage includes a drive and a filter basket. The filter basket defines a filter basket chamber for receiving an associated filter. The filter basket includes a movable component operably connected to the drive and movable for deforming the associated filter. The movable component is operable between a first operating position where the filter chamber has a first dimension and a second operating position where the filter chamber has a second dimension that is smaller than the first dimension.

22 Claims, 7 Drawing Sheets

HOT BEVERAGE MAKER WITH FILTER DEFORMING MEMBER

BACKGROUND

Coffee makers pass water through ground coffee beans to produce brewed coffee. Similarly, water can be passed through tea leaves, or similar, to produce brewed tea. Since the processes are similar, for the sake of brevity, processes by which brewed coffee is made will be described with more particularity. Usually, water is deposited on top of dried ground coffee beans residing in a filter, which is supported by a filter basket. The flavor and color that is extracted from the ground coffee is a function of the intermixing of the hot water with the ground coffee during the time the hot water is traveling through the ground coffee and the filter en route to a carafe that collects the brewed beverage.

Attempts have been made to increase the intermixing of the hot water with the ground coffee during the time when the hot water is traveling through the ground coffee. Such attempts include the following: stirring the coffee grounds and water mixture with a blade that is suspended in the filter basket, agitating the entire filter basket using an ultrasonic vibrating device, rotating the filter basket about a vertical axis, and introducing water at a high velocity, as compared to the velocity at which the water is introduced in a conventional drip coffee maker, into the filter basket.

Stirring the ground coffee and hot water mixture has been found to be adequate to extract more flavor from the same amount of dried coffee as compared to simply passing water through the ground coffee. The blade used in the mixing process, however, should be cleaned after each brewing process, which requires the person making the coffee to clean an extra component of the coffee maker. Additionally, it can be difficult to fit the blade into the filter basket when a large amount of dried ground coffee has been placed in the filter basket. Moreover, removal of the filter basket from a conventional drip coffee maker that uses a basket filter can require a complex mechanism to retract the blade.

Agitating the entire filter basket by the ultrasonic vibrating device produces localized eddies that do not result in adequate mixing of the ground coffee in the hot water. Additionally, the ultrasonic vibrator can be loud and also result in the vibration of other components of the coffee maker, especially those that are in proximity to or in direct contact with the filter basket.

Rotating the entire filter basket about a vertical axis does not result in adequate mixing of the contents in the filter basket until the inertial forces of the water and coffee grounds mixture are overcome. Overcoming the initial inertial forces may take more time than the amount of time required for water to pass through the coffee grounds en route to the brewed coffee reservoir. Also, a vortex can form which can result in water flowing over the side of the filter basket.

Introducing hot water at a high velocity can be messy if the contents of the filter basket are not well confined and/or sealed. Additionally, an expensive pump may be required to deliver the water at the high velocity.

SUMMARY OF THE INVENTION

A process for making a hot beverage, such as coffee or tea, that overcomes the problems associated with known devices includes placing ground coffee or tea into a filter, inserting the filter into a filter basket to support the filter with respect to a reservoir that is to receive a brewed beverage; introducing water into the filter; and repeatedly deforming the filter to alter its shape as water passes through the filter and ground coffee or tea en route to the reservoir.

A device for making a hot beverage includes a drive and a filter basket. The filter basket defines a filter basket chamber for receiving an associated filter. The filter basket includes a movable component operably connected to the drive and movable for deforming the associated filter. The movable component is operable between a first operating position where the filter chamber has a first dimension and a second operating position where the filter chamber has a second dimension that is smaller than the first dimension.

Alternatively, the device for making a beverage can include a filter basket, a filter deforming member, and a drive. The filter deforming member connects to the filter basket and is movable towards an interior of the filter basket. The drive is operably connected to the filter deforming member to move the filter deforming member.

DETAILED DESCRIPTION

A coffee or tea maker that can deform a filter to promote the mixing of hot water and ground coffee or tea includes a filter basket 10 having a side wall 12 and a base wall 14 that both define a filter chamber 16. The filter basket 10 can simply rest on a reservoir that is to receive the brewed beverage, similar to a manual coffee maker, or the filter basket 10 can be inserted into a coffee maker that is similar to a conventional drip coffee maker, e.g. one that includes a fresh water reservoir and a heating element to heat the fresh water. The filter basket 10 depicted in FIG. 1 generally receives what is referred to in the art as a paper basket filter. The filter basket can take other configurations, one such example being a cone shape to receive what is known in the art as a paper cone shaped filter. In addition to being configured to receive these typically shaped filters, the filter basket can take other configurations.

Figure 1:
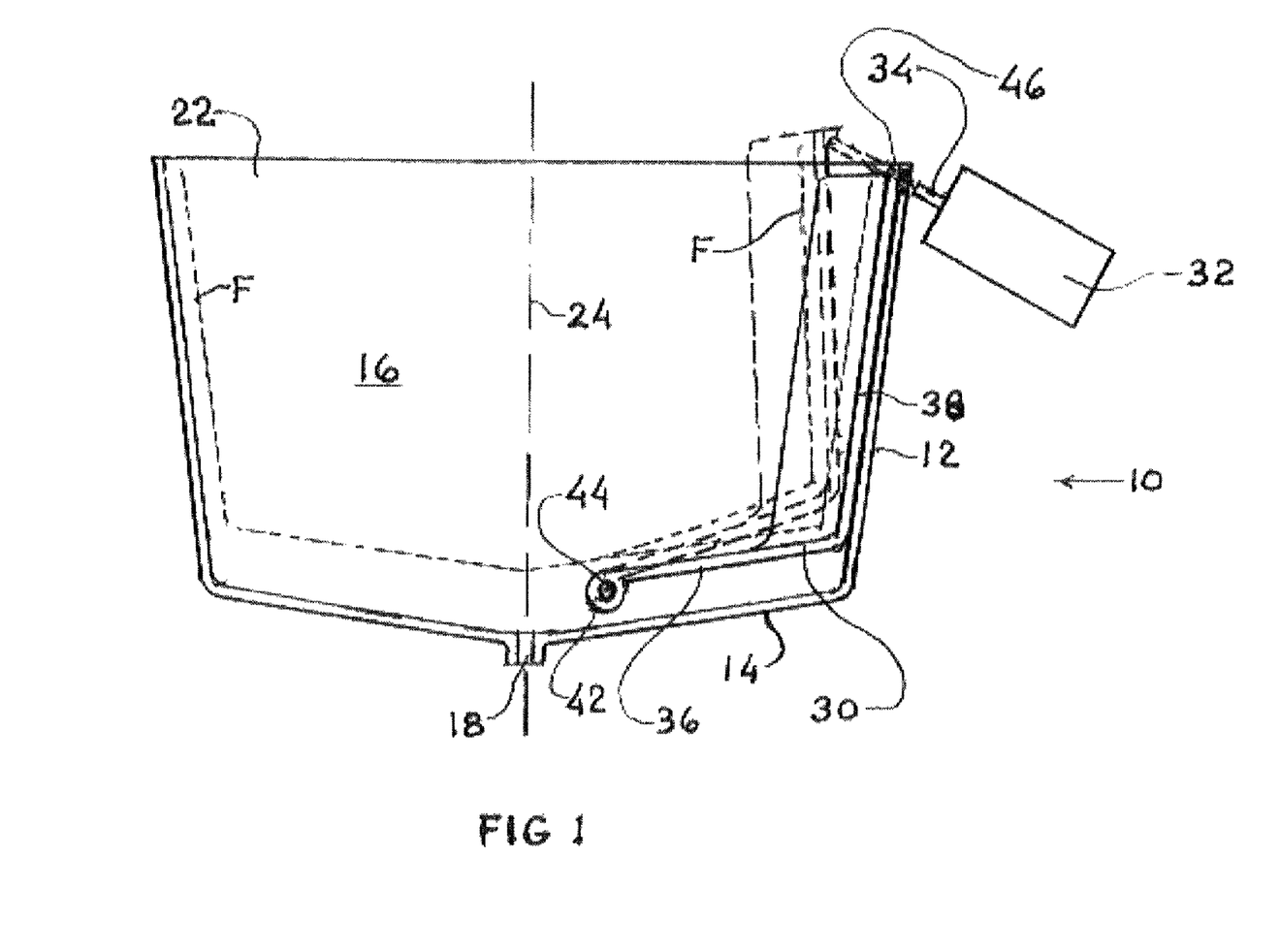
FIG. 1 is side cross-sectional view of a first embodiment of a beverage maker including a filter basket and movable component for deforming a filter disposed in the filter basket.

With reference back to the embodiment depicted in FIG. 1, the base wall 14 defines an opening 18 that acts as an outlet for the filter chamber 16. The upper edge of the sidewall 12 defines a much larger opening that acts as an inlet opening 22 for the filter chamber 16. The sidewall 12 is typically axially symmetric about a vertical axis 24, which is also concentric with the center of the filter basket outlet 18.

An appropriately shaped filter F (depicted in phantom in FIG. 1) is received in the filter basket. Ground coffee or tea is then placed in the filter F and then hot water is introduced into the filter to pass through the ground coffee or tea and to discharge through the outlet opening 18 en route to a reservoir (not shown) that is to receive the brewed beverage, whether it be brewed coffee or brewed tea. For the sake of brevity throughout the remainder of the description the beverage maker may be described as a coffee maker and the processes involved with the device will be described for preparing coffee; however, it should be understood that the beverage maker can be used to make tea or another hot beverage.

Repeatedly deforming the filter F to alter the shape of the filter as water passes through the filter and ground coffee can result in enhanced flavor of the brewed beverage because of the intermixing of the hot water with the ground coffee during the time that the hot water resides in the filter chamber 16. The deformation of the filter F can be accomplished in many ways, a few of which will be described below with particularity.

Pressing against a side of the filter F that rests against the side wall 12 of the filter basket 10 is one way to deform the filter. The fluid pressure of the hot water in the filter chamber can return the filter to its undeformed state when the external force that causes the deformation has been removed. The filter basket 10 maintains the shape of the filter F in its initial state. The filter can be repeatably deformed in cycles between about 30 cycles per minute to about 360 cycles per minute. A range between about 90 cycles per minute and about 180 cycles per minute has been found particularly desirable. Opposite sides of the filter F can be deformed, e.g., displaced toward the central axis 24, at the same time as one another. The displacement of the filter from its initial state to its deformed state correlates to an amplitude of a wave generated in the water and coffee grounds mixture. Caution should be taken to ensure that the frequency and displacement of the filter does not result in the amplitude of the waves in the water to constructively interfere with one another which could result in water flowing over and out of the filter basket 10. Moreover, displacement of the filter by pressing against an exterior surface of the filter, e.g. surface of the filter F that abuts side wall 12 or the base wall 14 of the filter basket 10, results in a cleaner device as compared to devices that utilize blades to mix the contents of the filter chamber. This is because the filter deforming member does not come into direct contact with the coffee and water mixture, because of the filter being interposed between the coffee/hot water mixture and the filter deforming member. Accordingly, the device is very easy to clean.

With reference to FIG. 1, an example of a filter deforming member, which in the depicted embodiment is a paddle 30, is shown operably connected to an electromechanical solenoid 32 having a movable armature 34 that moves linearly to pivot the paddle 30 between a first operating position where the coffee filter chamber 16 has a first radial dimension and a second operating position where the coffee filter chamber has a second, smaller, radial dimension. The electromechanical solenoid can be replaced with a linear motor or another type of linear actuator. Other drive mechanisms that can move the paddle with respect to the filter basket can also be employed.

In the embodiment depicted in FIG. 1, the paddle 30 has a generally flat base 36 that is generally parallel to the base wall 14 of the filter basket 10 when in the first operating position and a curved side wall 38 that generally follows the contour of the side wall 12 of the filter basket 10 with respect to the vertical axis. A loop 42 is provided at an end of the base 36 of the paddle 30 adjacent the outlet 18. An axle 44 is received in the loop 42 to connect the paddle 30 to the filter basket 10 so that the paddle 30 rotates with respect to the filter basket 10 about the axle 44. The axle 44, which can also simply extend from the paddle 30 as opposed to being disposed in the loop 42, can be received inside a corresponding notch or opening found in the filter basket 10 to connect the paddle 30 to the filter basket 10 while allowing the paddle 30 to rotate with respect to the filter basket 10.

To rotate or pivot the paddle 30, which deforms a filter F, the armature 34 of the electromechanical solenoid 32 (or other drive) extends through a notch 46 formed in an upper edge of the filter basket 10. The electromechanical solenoid 32 can receive power from a conventional AC power source via a plug where the filter basket is inserted into a coffee maker similar to a conventional drip coffee maker. The electromechanical solenoid can also receive power from a DC power source, e.g. batteries, where the filter basket and the electromechanical solenoid are similar to a conventional manual coffee maker where one pours hot water into the filter chamber. The filter basket 10 can include an alignment feature, e.g. flanges (discussed below), to facilitate aligning the notch 46 with the travel path of the armature 34 when the filter basket is being inserted into a coffee machine after being filled with fresh coffee grounds.

Figure 2:
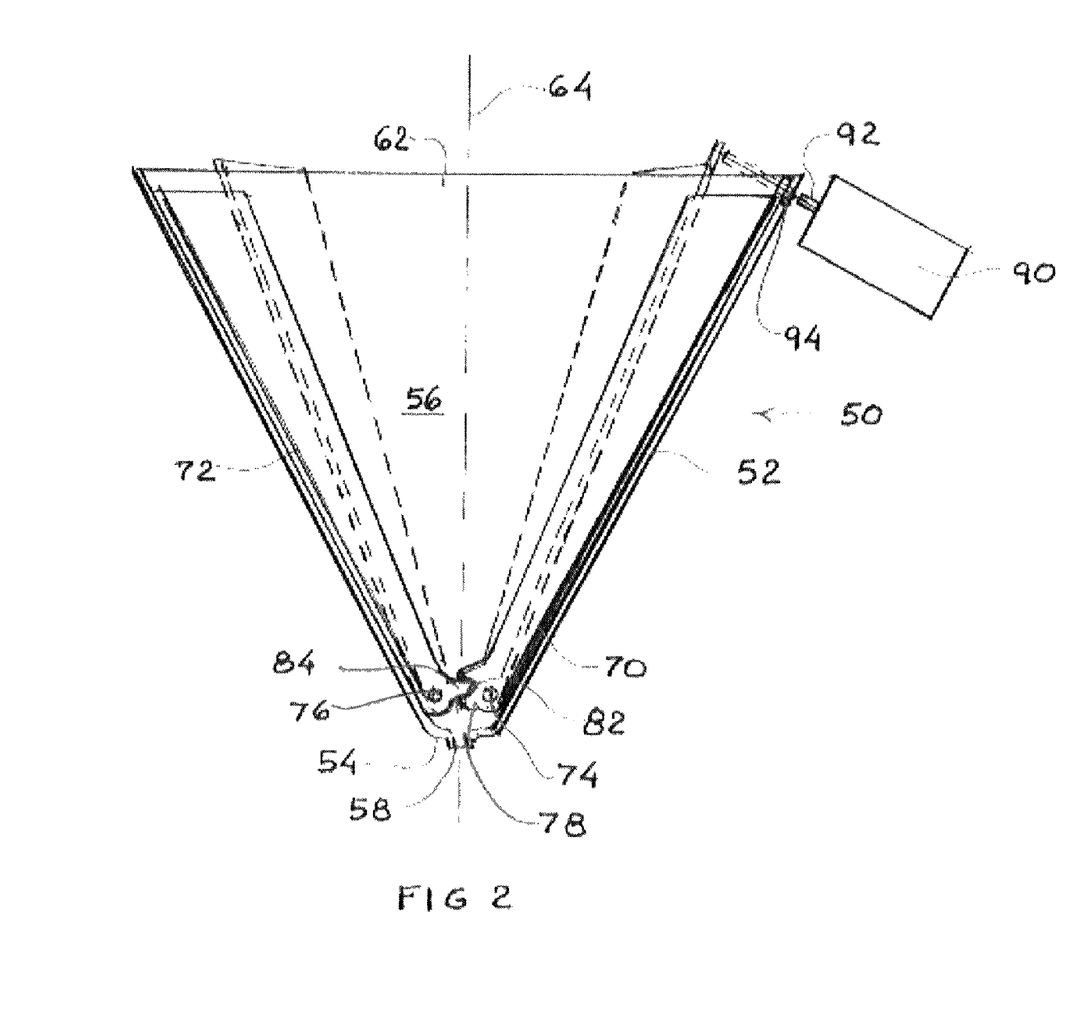
FIG. 2 is another embodiment of a beverage maker including a movable component for deforming a filter.

With reference to FIG. 2, an alternative configuration of a filter basket 50 is shown. In this embodiment, the filter basket is similar in shape to a conventional filter basket configured to receive a conventional cone shaped filter, e.g. No. 4 or No. 6. The filter basket depicted in FIG. 2 includes a generally conically shaped side wall 52 and a base wall 54 that define a filter chamber 56. A discharge outlet 58 is provided in the base wall 54 and the upper edge of the side wall 52 defines an inlet opening 62 that is generally circular in configuration. A vertical axis 64 extends through the discharge outlet 58.

The embodiment depicted in FIG. 2 is similar to the embodiment depicted in FIG. 1 in that this embodiment includes a filter deforming member, more specifically, two filter deforming members. The embodiment depicted in FIG. 2 includes a first filter deforming member 70 and a second filter deforming member 72 that is disposed on an opposite side of the filter basket chamber 56 as the first filter deforming member. Each deforming member 70, 72 is a paddle that is curved with respect to the vertical axis 64 to follow the contour of the side wall 52 of the filter basket 50. Each paddle 70, 72 connects to the filter basket 50 at respective axles 74, 76. The first paddle 70 engages the second paddle 72 so that pivotal movement of the first paddle 70 results in pivotal movement of the second paddle 72. More specifically, the first paddle 70 engages the second paddle 72 so that pivotal movement of the first paddle 70 towards the vertical axis 64 results in vertical movement of the second paddle 72 towards the vertical axis 64. To accomplish this, the first paddle includes ridges 78 at a lower end that define a notch 82 that receives a projection 84 formed at a lower end of the second paddle 72.

To deform a filter (not shown) placed in the filter chamber 56, the paddles 70 and 72 are moved in the filter chamber 56 using a drive. The drive in the embodiment depicted in FIG. 2 includes an electromechanical solenoid 90, or similar actuator or assembly that imparts linear movement of an arm, that includes an armature 92 that extends through a notch 94 formed in an upper edge of the side wall 52 of the filter basket 50, similar to the embodiment depicted in FIG. 1.

Figure 3:
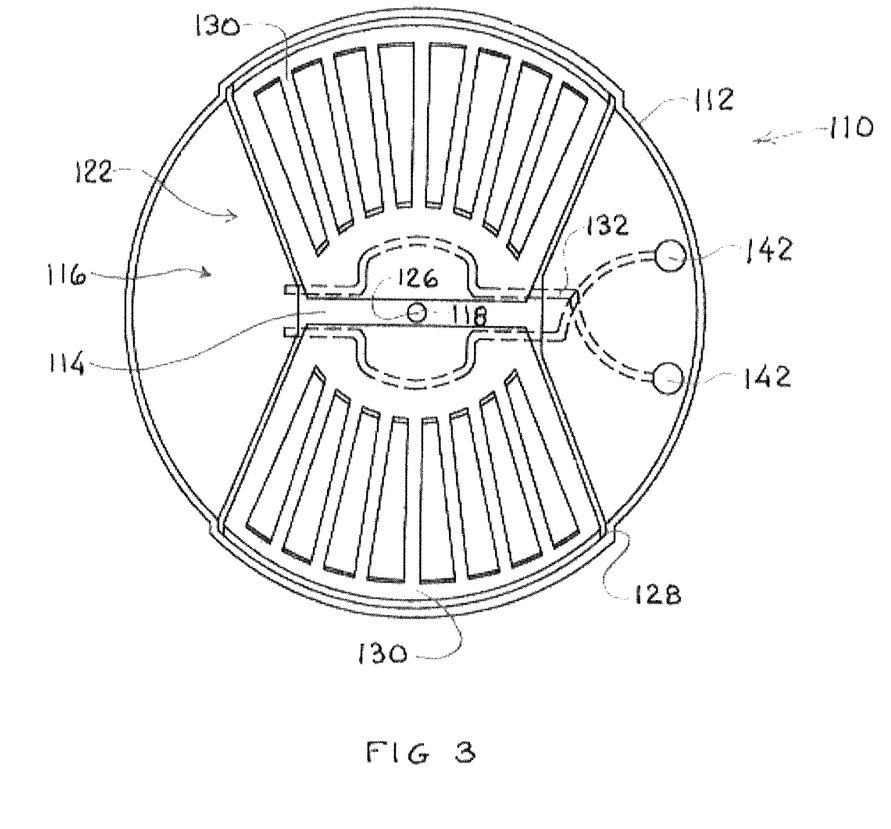
FIG. 3 is a top plan view of another embodiment of a beverage maker including a movable component for deforming a filter.

FIG. 3 depicts another embodiment of a device capable of deforming a filter when brewing coffee. A filter basket 110 includes a generally conical side wall 112 and a planar base wall 114 that defines a filter chamber 116. A discharge outlet 118 is formed through the base wall 114 and the upper edge of the side wall 112 defines a large inlet 122 for the filter chamber 116. A vertical axis 126 (see also FIGS. 5 and 6) extends through the discharge outlet 118.

Paddles 130 are provided in the filter basket 110 to deform a filter received in the filter basket so that the radial dimension (the dimension that radiates from the vertical axis 126) of the filter can be changed. As most clearly seen in FIG. 3, the side wall 112 with the filter basket 110 can be formed to include recesses 128 that are each configured to receive a respective paddle 130 so that the inner surface of the paddle is flush with the inner surface of the remaining side wall 112 that does not include the recess 128.

Figure 5:
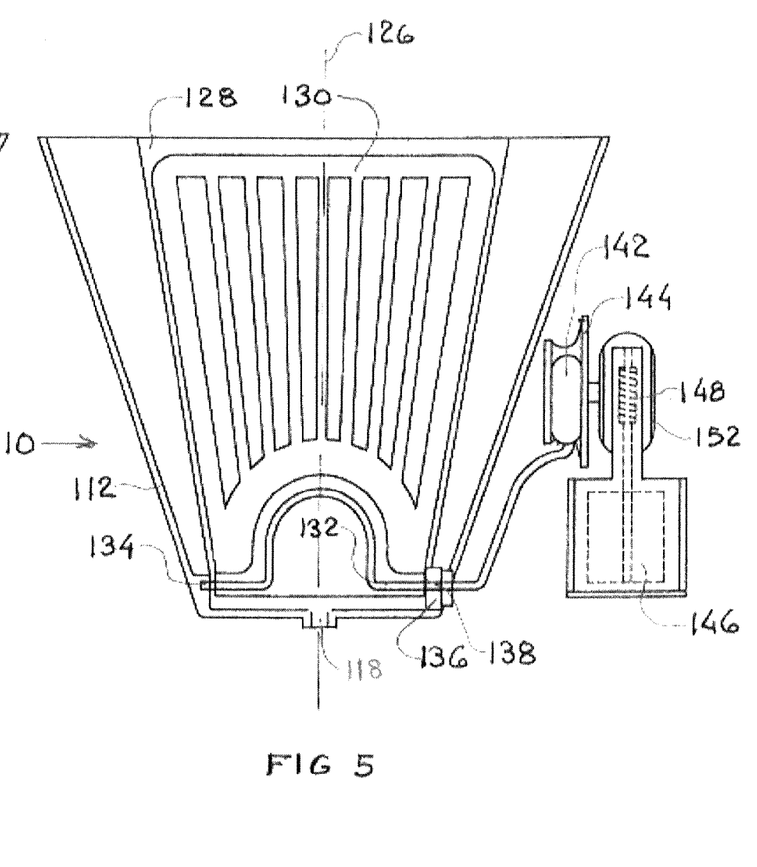
FIG. 5 is another side cross-sectional view taken 90° to that shown in FIG. 4.

With continued reference to FIG. 3, an axle 132 attaches to a lower end of each paddle 130. As more clearly seen in FIG. 5, each end of the axle 132 is received in an opening found in a support 136 formed of the side wall 112 of the filter basket 110. The axle 132 extends through an O-ring gasket 138 that contacts a lower portion of the side wall 112 of the filter basket 110 and the axle 132. With reference back to FIG. 3, the axles 132 for the respective paddles 130 cross one another when outside of the filter basket 110 and connect to cam followers 142. With reference to FIG. 5, the cam followers 142 engage a cam 144 driven by a motor 146 through a worm 148.

In the depicted embodiment, the cam 144 is a dual-lobed cam which provides one cycle or pivot of the paddle 130 towards the vertical axis 126 of the filter basket for each half rotation of the cam. The cam 144 is configured so that each paddle 130 moves approximately 7° away from the side wall 112 of the filter basket 110. The axles cross one another (see FIG. 3) prior to engaging the cam 144, which allows for movement of the paddles 130 towards one another. The return of the paddles 130 towards the side walls is caused by the fluid pressure of the water and coffee or tea mixture in the filter basket during the brewing process. Displacement of the paddles 130 is designed to provide great enough turbulence for adequate mixing of the hot water and coffee grounds found in the filter basket while preventing any wave in the filter basket adding its amplitude to another wave which could result in a surge and overflow of water from the filter basket. A displacement of approximately 7° from the side wall 112 and a cycling between 90 and 180 cycles per minute has been found to provide adequate results in a filter basket that is configured to receive a conventional No. 4 or No. 6 cone-shaped filter (as well as conventional basket filters, which can be larger or smaller) where the paddles are similar to those shown in FIG. 3. The paddles can take alternative configurations, e.g. being thinner in a circumferential direction, which may result in a change of frequency and magnitude of the movement of the paddles 130.

Figure 4:
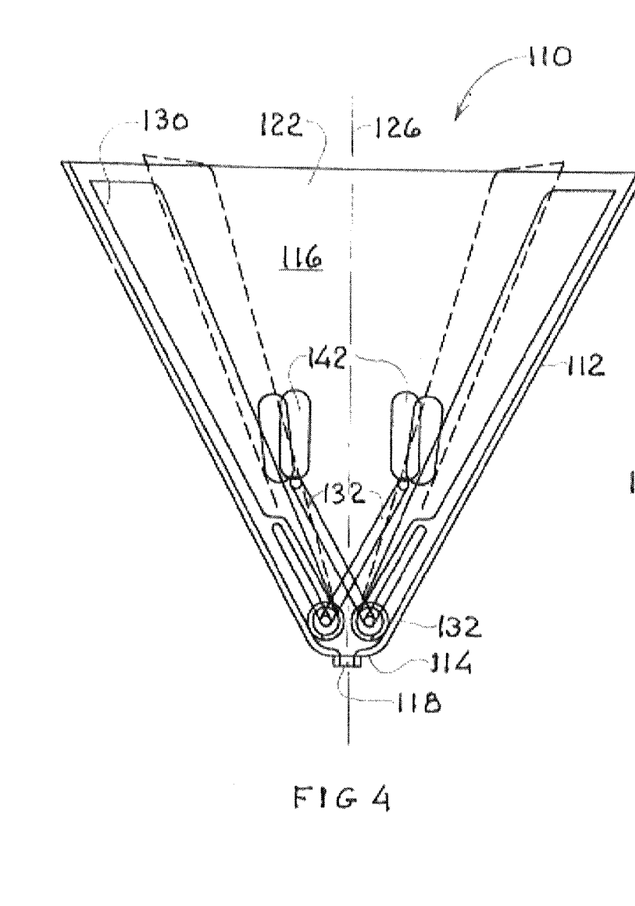
FIG. 4 is a side cross-sectional view of the beverage maker depicted in FIG. 3.

As discussed above, the filter basket can take other configurations. The filter basket 110 shown in FIG. 4 is configured to receive a conventional No. 4 cone filter. The configuration of the filter basket can change so that it is configured to receive a conventionally shaped basket-type filter (see FIG. 2 for example) which would result in a slight reconfiguration of the paddles or filters that have another configuration.

Figures 6, 7:
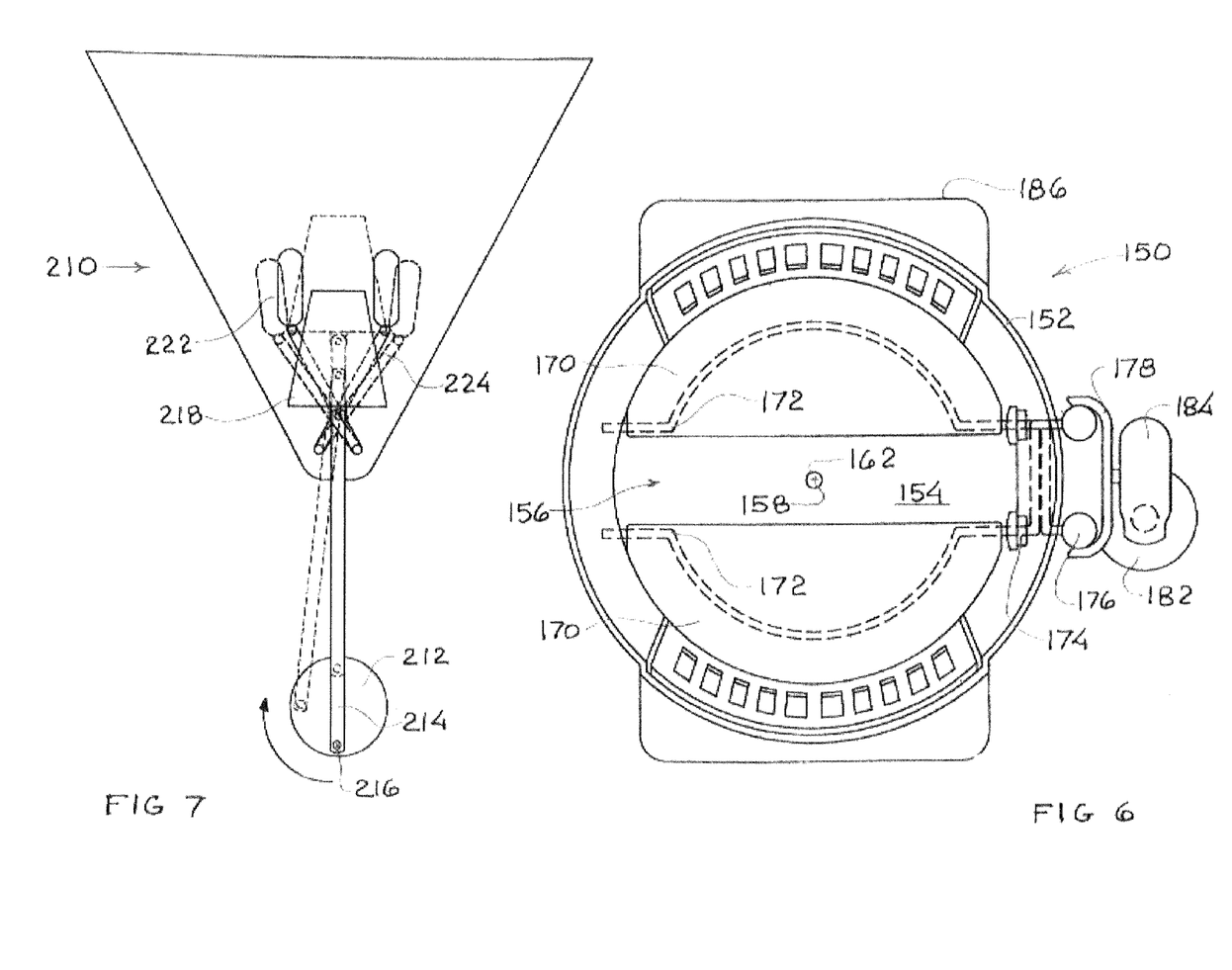
FIG. 6 is a top plan view of another embodiment of a beverage maker including a movable component for deforming a filter.
FIG. 7 is a schematic depiction of an embodiment of a drive for a beverage maker including a movable component for deforming a filter.

With reference to FIG. 6, an example of another drive mechanism for displacing a filter is disclosed. Filter basket 150 includes a side wall 152 and a base 154 that define a filter chamber 156. A discharge outlet 158 is provided in the base 154. Paddles 170 are disposed in the filter basket 150. Axles 172 are provided at a lower edge of each paddle 170. Each axle extends through an O-ring gasket 174 located in an opening in the side wall 152 of the filter basket 150. The axle 172 continues beyond the sidewall 152 of the filter basket 150 and connects to a cam follower 176 that is received inside an eccentric cam socket 178. The interior surface of the cam socket 178 follows a path that translates the rotational movement from the electrical motor 182 that drives the cam socket 178 through a transmission 184 so that the paddles 170 pivot towards a vertical axis 162 of the filter basket 150 as the cam 178 rotates. Alignment features, such as flanges 186, extend from an upper edge of the side wall 152 to facilitate insertion of the filter basket 158 into a drip coffee machine so that the cam followers 176 are received in the cam socket 178.

FIG. 7 depicts an alternative drive mechanism for moving movable members within a filter basket to deform a paper coffee filter placed in the filter chamber. The filter basket 210 is shown as a cone-shaped filter basket; however, the filter basket can take alternative configurations. A wheel 212, which can be driven by a motor (not shown), has rod 214 attached to the wheel 212 near a circumferential edge of the wheel by a pin 216. A block 218, which takes the shape of an isosceles trapezoid in a side elevation view, contacts followers 222 that are attached to axles 224, which attach to paddles (not shown) similar to those described above.

Figure 8:
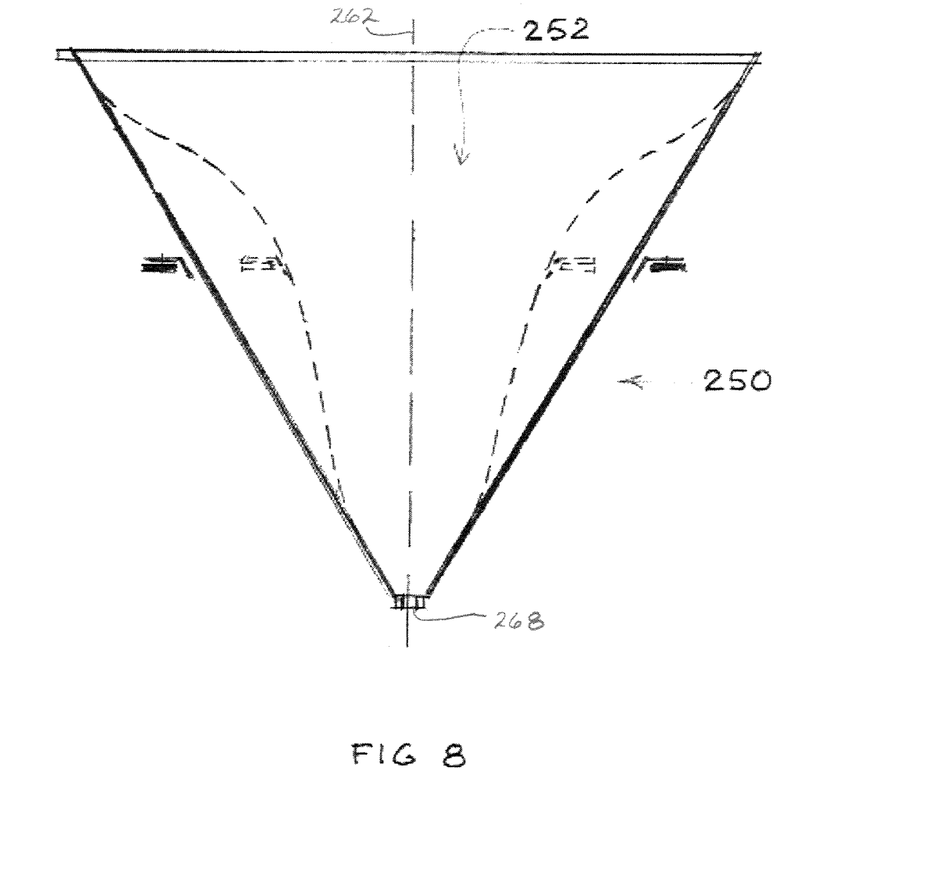
FIG. 8 is a side cross-sectional view of another embodiment beverage maker including a movable component for deforming a filter.
Figure 9:
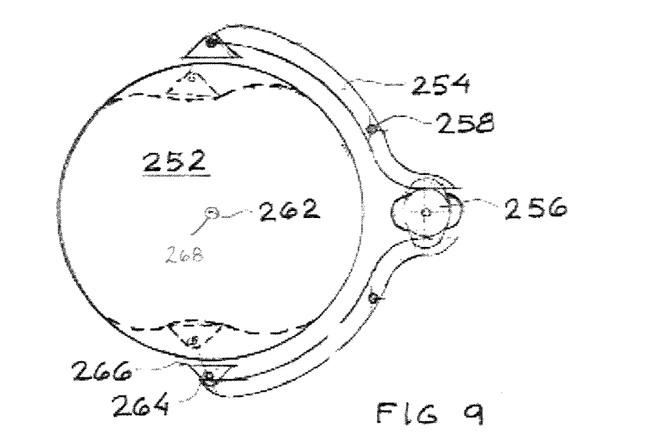
FIG. 9 is a plan view including a schematic depiction of a drive mechanism for deforming a filter disposed in the beverage maker shown in FIG. 8.

With reference to FIG. 8, deformation of a coffee filter in a filter basket can also be provided where a filter basket 250 is formed of a flexible material, e.g. silicone, so that the movable component that moves the coffee filter is a flexible side wall of the filter basket. The filter basket 250 defines a filter basket chamber 252 in which the coffee filter is received. With reference to FIG. 9, caliper arms 254 driven by a cam 256, which is a dual-lobed cam similar in configuration to the cam 144 described above, can pivot about axles 258 to compress the coffee filter towards a vertical axis 262 in the coffee filter chamber 252. Clamps 264 having a widened contact surface 266 can be disposed at distal ends of each caliper arm 254 to contact the flexible sidewall of the filter basket 250 thus compressing the filter basket along with the filter towards the vertical axis 262 to agitate the contents in the filter basket chamber 252 as the brewed beverage passes through the outlet 268.

Figure 10:
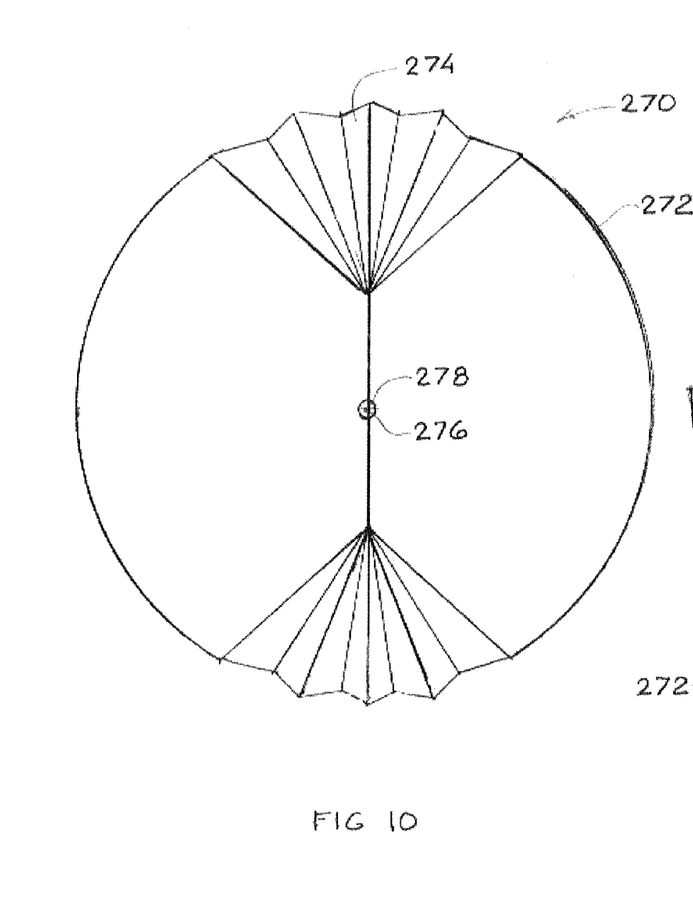
FIG. 10 is a plan view of another embodiment of a beverage maker including a movable component for deforming a filter.
Figure 11:
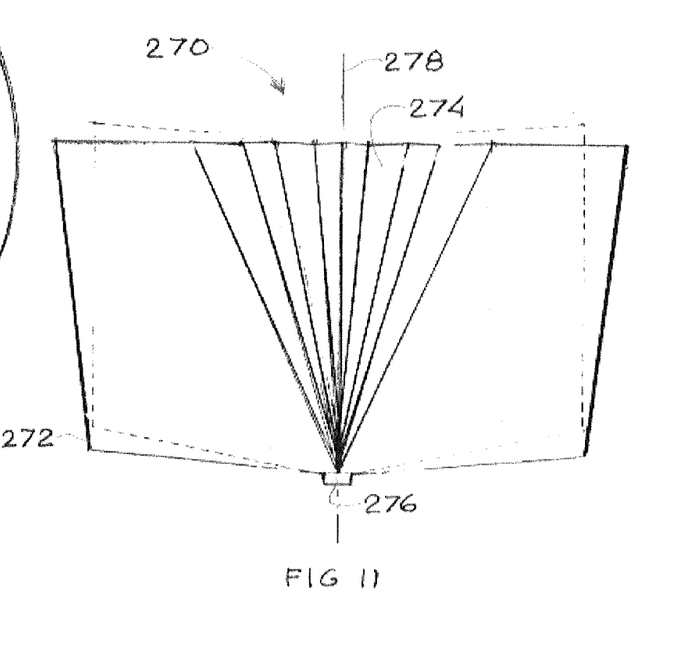
FIG. 11 is a side cross-sectional view of the beverage maker shown in FIG. 10.

With reference to FIG. 10, the filter basket 270 can also have a pleated configuration whereby the filter basket is made of a slightly more rigid material as compared to silicone. For example, with reference to FIGS. 10 and 11, a filter basket 270 includes rigid side wall sections 272 of the filter basket and accordion sections 274 formed on an opposite side of a diameter of the filter basket (similar to those described above). The rigid portion of the side wall 272 (at approximately the 3:00 and 9:00 position shown in FIG. 11) can be moved towards a vertical axis 278 as the brewed beverage passes through the discharge outlet 276 similar to that shown in FIG. 9. The accordion section 274 allows the entire filter basket 270 to flex thus deforming the filter disposed in the filter basket.

The filter baskets described above can fit into a coffee maker that is similar to a conventional drip coffee maker, which typically includes a fresh water reservoir, a heating element, and a discharge tube leading from the heating element towards the filter basket thus depositing hot water. The filter baskets described above can also be used as a separate device, for example known as a manual pour-through coffee maker, where hot water is heated elsewhere, e.g., on a stove or in a microwave oven, and then introduced into the filter chamber.

The above described devices are very easy to clean since the coffee grounds are separated from the movable members that deform the filter by the filter that is placed inside the filter basket. Agitation of the entire contents of the filter basket, i.e., water and coffee and/or tea, is accomplished due to the repeated deformation of the filter altering its shape as water passes through the contents found in the filter. This mechanism results in adequate mixing of the contents of the coffee filter that quickly overcomes the inertial forces of the water and does not require an expensive pump to rapidly introduce water into the filter basket chamber.

A process for making a beverage and devices for making the beverage have been described with particularity. The process and the devices have been described above so that one skilled in the art can make and use the invention. The components from one of the embodiments described above can be combined with or replace the components of another one of the embodiments. Additionally, the drive that moves the member that deforms the filter can be a wind up mechanism or a steam operated device that uses the energy from the heated water to move the moveable member. The invention is not to be limited to only those embodiments described above. Instead, the invention is defined by the appended claims and the equivalents thereof.

The invention claimed is:

1. A coffee maker comprising:
   a drive; and
   a filter basket defining a filter basket chamber for receiving an associated coffee filter, the filter basket chamber defining a central vertical axis, the filter basket including a movable component operably connected to the drive, wherein the drive rotates the movable component back and forth about a generally horizontal axis for repeatedly deforming the associated coffee filter, the movable component rotates between a first operating position where the filter basket chamber has a first dimension and a second operating position where the filter basket chamber has a second dimension that is smaller than the first dimension.

2. The coffee maker of claim 1, wherein the filter basket includes a flexible side wall which is the movable component.

3. The coffee maker of claim 2, wherein the flexible side wall is pleated.

4. The coffee maker of claim 1, wherein the movable component is a paddle connected to the filter basket, and the paddle pivots towards the central vertical axis.

5. The coffee maker of claim 1, wherein the first dimension and the second dimension are perpendicular to the central vertical axis.

6. The coffee maker of claim 1, wherein the movable component includes a first movable component and a second movable component, each movable component operably connected to the drive and movable towards an interior of the filter basket chamber.

7. The coffee maker of claim 6, wherein the first movable component is disposed generally opposite to the second movable component.

8. The coffee maker of claim 6, wherein the drive is connected to a cam and the first movable component and the second movable component are each operably connected to the cam.

9. The coffee maker of claim 8, wherein the cam is a dual-lobed cam.

10. The coffee maker of claim 1, wherein the drive includes an electromechanical solenoid, a linear motor or a linear actuator.

11. A beverage maker comprising:
    a filter basket for receiving an associated coffee filter;
    a filter deforming member;
    an axle connecting the filter deforming member to the filter basket, the filter deforming member rotating generally horizontally on the axle away from and back towards a side wall of the filter basket; and
    a drive operably connected to the filter deforming member for rotating the filter deforming member with respect to the side wall of the filter basket.

12. The beverage maker of claim 11, wherein the filter basket is removable from the beverage maker and the drive operably connects to the filter deforming member upon insertion of the filter basket into the beverage maker.

13. The beverage maker of claim 11, further comprising a cam operably connected to the drive and a lever operably connected to the filter deforming member and contacting the cam, wherein rotational movement of the cam results in pivotal movement of the filter deforming member.

14. The beverage maker of claim 11, wherein the filter basket includes a recess extending outward from an internal surface of the filter basket and the filter deforming member is received in the recess such that the internal surface of the filter basket is substantially flush with an internal surface of the filter deforming member.

15. The beverage maker of claim 11, wherein the filter deforming member includes a curved inner surface that generally follows a radius of a side wall of a conventional cone coffee filter or a conventional basket coffee filter.

16. The beverage maker of claim 11, wherein the filter deforming member includes a first filter deforming member and a second filter deforming member disposed opposite the first filter deforming member.

17. The beverage maker of claim 11, wherein the drive is an electrically powered drive configured to repeatedly deform the associated filter at least about 30 cycles per minute.

18. The coffee maker of claim 4, wherein the axle extends from the paddle.

19. A coffee maker comprising:
    a filter basket defining a filter basket chamber for receiving an associated coffee filter, the filter basket chamber defining a central generally vertical axis, the filter basket including a movable component that rotates about a generally horizontal axis towards and away from the central generally vertical axis; and
    a drive operably connected to the movable component for repeatedly deforming the associated coffee filter.

20. The coffee maker of claim 19, wherein the filter basket includes a flexible side wall which is the movable component.

21. The coffee maker of claim 19, wherein the movable component is a paddle connected to the filter basket.

22. The coffee maker of claim 19, wherein the movable component includes a first movable component and a second movable component, each movable component being operably connected to the drive and rotates about a respective generally horizontal axis towards and away from the central generally vertical axis.

* * * * *